(12) United States Patent
Tanaka et al.

(10) Patent No.: US 10,534,239 B2
(45) Date of Patent: Jan. 14, 2020

(54) OPTICAL MODULATOR

(71) Applicant: Mitsubishi Electric Corporation, Chiyoda-ku (JP)

(72) Inventors: Toshiyuki Tanaka, Tokyo (JP); Koichi Akiyama, Tokyo (JP); Eiji Yagyu, Tokyo (JP); Kiyotomo Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/092,357

(22) PCT Filed: Feb. 23, 2017

(86) PCT No.: PCT/JP2017/006805
§ 371 (c)(1),
(2) Date: Oct. 9, 2018

(87) PCT Pub. No.: WO2017/208526
PCT Pub. Date: Dec. 7, 2017

(65) Prior Publication Data
US 2019/0129273 A1 May 2, 2019

(30) Foreign Application Priority Data

Jun. 3, 2016 (JP) .................. 2016-111475

(51) Int. Cl.
*G02F 1/225* (2006.01)
*G02F 1/017* (2006.01)
(Continued)

(52) U.S. Cl.
CPC ........ *G02F 1/2255* (2013.01); *G02F 1/01708* (2013.01); *G02F 1/2257* (2013.01); *G02F 2001/212* (2013.01); *G02F 2203/50* (2013.01)

(58) Field of Classification Search
CPC .. G02F 1/2255; G02F 1/01708; G02F 1/2257; G02F 1/025; G02F 2001/212; G02F 2203/50
See application file for complete search history.

(56) References Cited

U.S. PATENT DOCUMENTS 8,948,608 B1 * 2/2015 Pobanz ................. H04B 10/25
398/183
2015/0078763 A1 3/2015 Sugiyama et al.

FOREIGN PATENT DOCUMENTS

JP 2014-010189 1/2014
JP 2015-55840 A 3/2015
(Continued)

OTHER PUBLICATIONS

International Search Report dated May 23, 2017, in PCT/JP2017/006805 filed Feb. 23, 2017.
(Continued)

*Primary Examiner* — Ryan A Lepisto
(74) *Attorney, Agent, or Firm* — Oblon, McClelland, Maier & Neustadt, L.L.P.

(57) ABSTRACT

An optical modulator having a small-sized circuit and a smaller voltage drop in a terminating resistor is provided. The optical modulator includes first and second optical waveguides, a first electrode inputting a first high frequency signal into the first optical waveguide, a second electrode inputting a second high frequency signal having a reverse phase relative to the first high frequency signal into the second optical waveguide, a first terminating resistor connected to the first electrode, a second terminating resistor connected to the second electrode, a connection point connecting the first and second electrodes via the first and second terminating resistors, and a DC voltage supply connected to the connection point. A resistance value of the first terminating resistor is equal to a characteristic imped- (Continued)

ance of the first electrode. A resistance value of the second terminating resistor is equal to a characteristic impedance of the second electrode.

7 Claims, 8 Drawing Sheets

(51) Int. Cl.
  *G02F 1/025* (2006.01)
  *G02F 1/21* (2006.01)

(56) References Cited

FOREIGN PATENT DOCUMENTS

JP            2016-031377       3/2016
WO    WO 2004/086126 A1    10/2004

OTHER PUBLICATIONS

Office Action dated Oct. 29, 2019 in Japanese Patent Application No. 2018-520362, with English-language translation, 6 pages.

* cited by examiner

F I G . 2
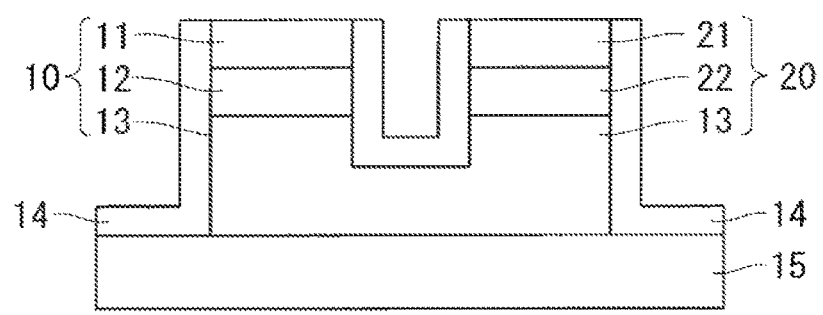
F I G . 3
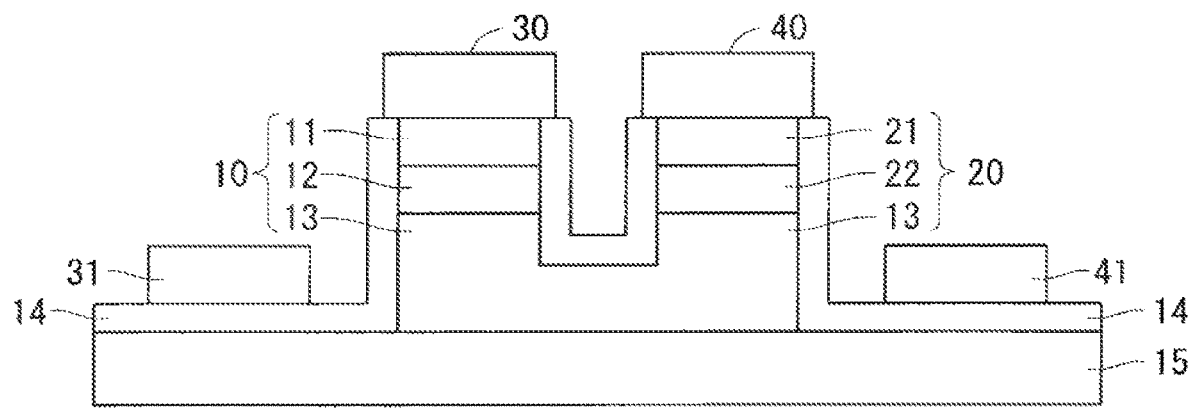

F I G . 4
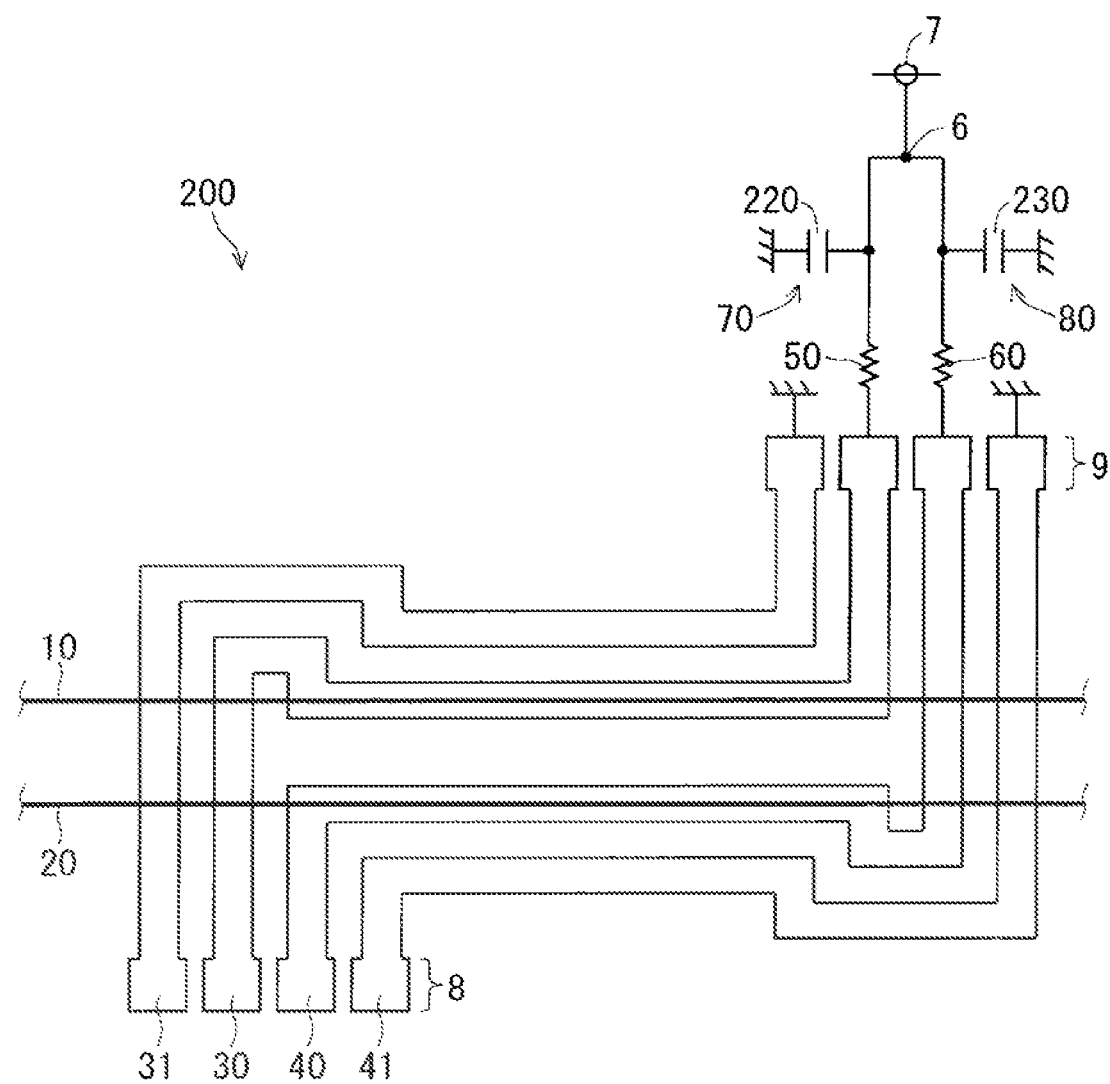

F I G . 6
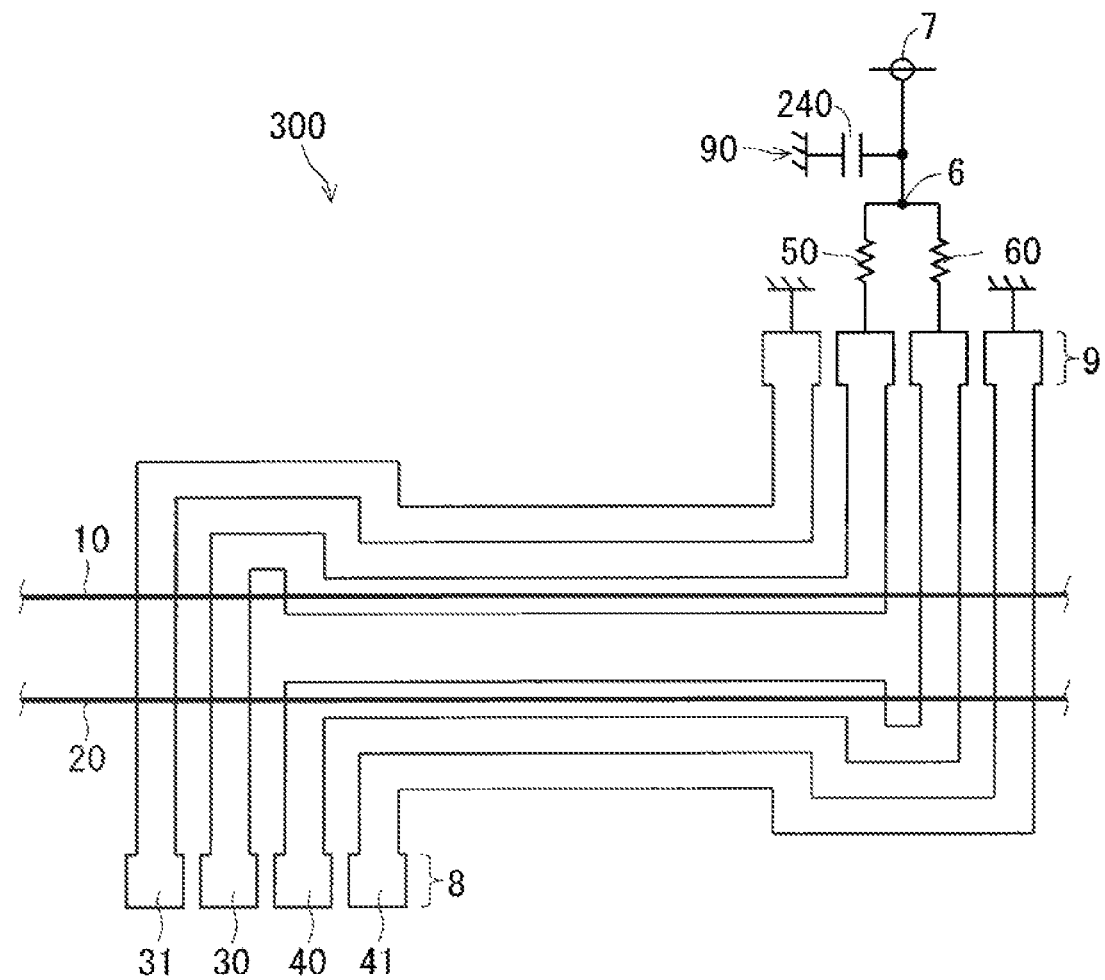

OPTICAL MODULATOR

TECHNICAL FIELD

The present invention relates to an optical modulator.

BACKGROUND ART

In recent years, larger capacity in an optical communication system is being developed in response to rapid increase in data communication amount. As a key device in the optical communication system, a semiconductor laser is widely used, which performs intensity modulation or phase modulation in accordance with a transmission range of an optical signal. In a short-to-intermediate range optical transmission system of 100 km or less such as a metropolitan area network (communication within a city) or a fiber to the home (FTTH) network, a small-sized device has been demanded, and an intensity modulation laser has been widely used. Meanwhile, in a long range optical transmission system of 100 km or more such as a core network (communication between cities), a phase modulation laser that realizes both of high-speed operation and long range transmission has already been in use.

As the phase modulation laser, a semiconductor Mach-Zehnder optical modulator (Mach-Zehnder Modulator, hereinafter referred to as "MZM") is widely used. The phase modulation MZM is a device that converts an electric digital signal into an optical digital signal. In the phase modulation MZM, phase modulation is performed on an output of continuous light (CW light) from a semiconductor laser by changing a refractive index of a semiconductor quantum well (Multi-Quantum Well, hereinafter referred to as "MQW") structure forming two optical waveguides, with the use of an electric signal.

In order to obtain satisfactory optical characteristics in the MZM, an optimal drive voltage needs to be input into the two optical waveguides. The drive voltage consists of an input electric digital signal (high frequency signal) and a direct current voltage that determines an operating point of the drive voltage. Therefore, a direct current voltage that determines the operating point needs to be applied to the two optical waveguides from an outside voltage supply, independently of the high frequency signal.

In order to input a high frequency signal and a direct current voltage into an optical waveguide, an MZM using a bias tee consisting of an inductor and a capacitor is widely used.

However, the size of the inductor incorporated into the bias tee is large, making it difficult to downsize the MZM. Hence, there was a problem in being unable to satisfy the demand of the market.

In view of this, with the purpose of downsizing the MZM, for example, Patent Document 1 describes a technology in which bias resistors having resistance values of from hundreds of ohms to several kiloohms are disposed in signal electrodes at terminating resistor parts that are respectively provided on two optical waveguides, and a direct current voltage is applied to the two optical waveguides via the bias resistors.

PRIOR ART DOCUMENT

Patent Document

Patent Document 1: Japanese Patent Application Laid-Open No. 2015-55840

SUMMARY

Problem to be Solved by the Invention

In the configuration of the MZM of Patent Document 1, a direct optical modulation current generated in consequence of the change in a refractive index of the optical waveguides flows through the bias resistors having high resistance values. Therefore, a large direct current voltage drop occurs in the bias resistors.

Further, there was a problem in the difficulty of controlling a direct current voltage applied to the optical waveguides, because a change in intensity and wavelength of light of the semiconductor laser in turn brings about a change in the magnitude of the generated optical modulation current.

The present invention has been made in order to solve the problems as in the above, and has an object to provide an optical modulator having a small-sized circuit configuration and a smaller voltage drop amount in a terminating resistor.

Means to Solve the Problem

An optical modulator according to the present invention includes first and second optical waveguides that propagate divided beams of light, a first signal electrode that inputs a first high frequency signal into the first optical waveguide, a second signal electrode that inputs a second high frequency signal having a reverse phase with respect to a phase of the first high frequency signal into the second optical waveguide, a first terminating resistor connected to the first signal electrode at a terminating part side, a second terminating resistor connected to the second signal electrode at a terminating part side, a connection point that connects the first and second signal electrodes via the first and second terminating resistors, and a direct current voltage supply connected to the connection point. A resistance value of the first terminating resistor is equal to characteristic impedance of the first signal electrode. A resistance value of the second terminating resistor is equal to characteristic impedance of the second signal electrode.

Effects of the Invention

In the optical modulator according to the present invention, there is an advantage in being capable of downsizing the optical modulator because of the configuration in which direct current voltages are applied to the first and second signal electrodes, with no bias tees provided on the terminating part side. Further, in the optical modulator according to the present invention, the values of the first and second terminating resistors are set to be equal to characteristic impedances of the first and second signal electrodes, respectively, and therefore the voltage drop amount in the first and second terminating resistors can be reduced. Therefore, there is an advantage in being capable of easily controlling direct current voltages to be applied to the first and second signal electrodes, as well as being capable of suppressing increase in power consumption.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a cross-sectional view taken along the line segment A-A of the optical modulator according to the first embodiment.

FIG. 3 is a cross-sectional view taken along the line segment B-B of the optical modulator according to the first embodiment.

FIG. 4 is a diagram illustrating a configuration of an optical modulator according to a second embodiment.

FIG. 6 is a diagram illustrating a configuration of an optical modulator according to a third embodiment.

DESCRIPTION OF EMBODIMENTS

<Underlying Techniques>

Figure 8:
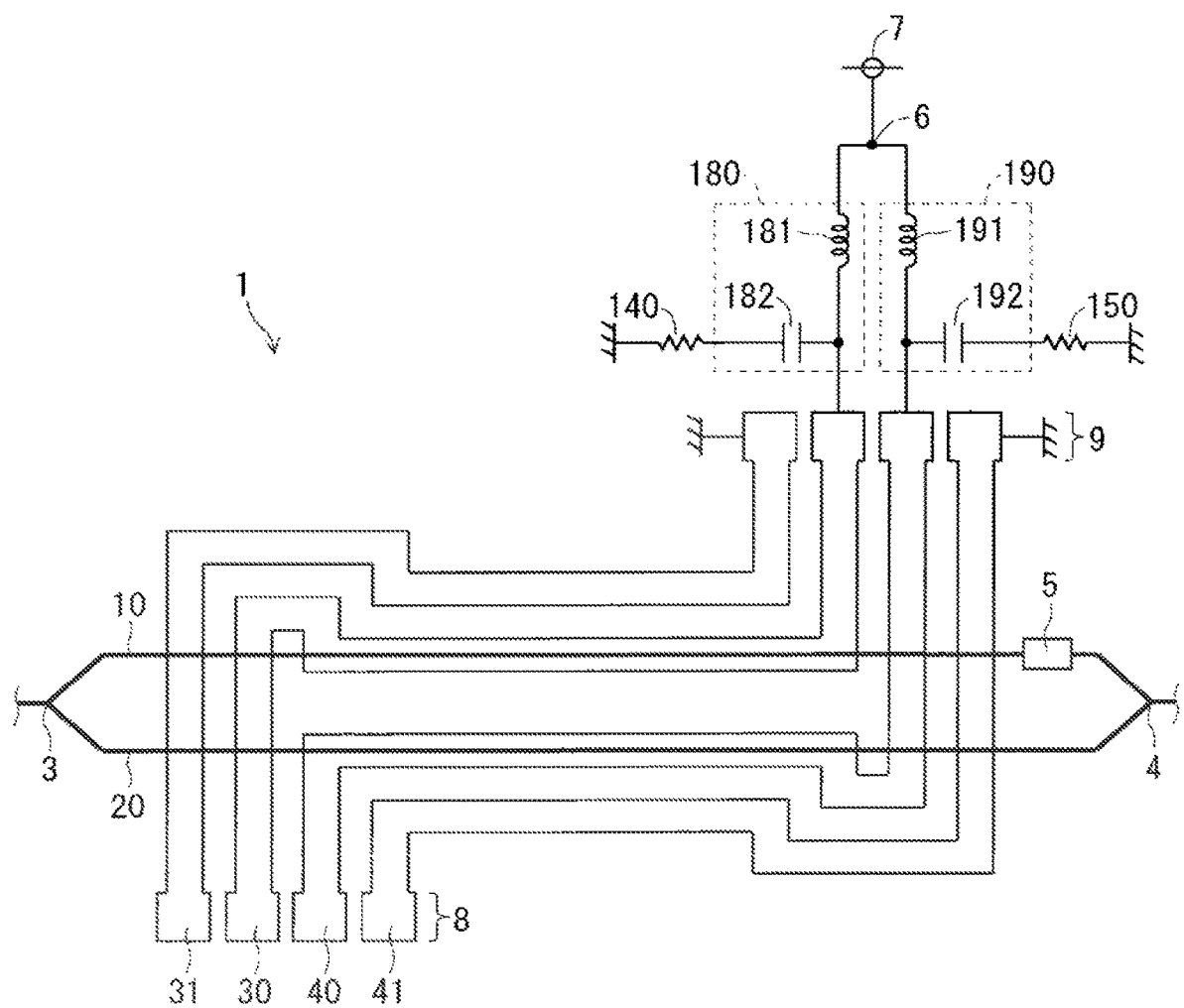
FIG. 8 is a diagram illustrating a configuration of an optical modulator according to a first underlying technique of the present invention.

Before giving description of embodiments of the present invention, underlying techniques of the present invention will be described. FIG. 8 is a diagram illustrating a configuration of an optical modulator 1 according to a first underlying technique of the present invention. The optical modulator 1 is a semiconductor Mach-Zehnder optical modulator (MZM). The optical modulator 1 includes first and second optical waveguides 10 and 20, first and second signal electrodes 30 and 40, terminating resistors 140 and 150, and a direct current voltage supply 7.

Continuous light from a semiconductor laser not shown enters an optical demultiplexer 3. Beams of the light subjected to demultiplexing at the optical demultiplexer 3 are propagated in respective first and second optical waveguides 10 and 20. An optical phase π shifter 5 is connected to the first optical waveguide 10 at an emitting side. The optical phase π shifter 5 inverts a phase of the light by π. The beams of light emitted from the first and second optical waveguides 10 and 20 are subjected to multiplexing at an optical multiplexer 4. The continuous light that has been subjected to phase modulation is emitted from the optical multiplexer 4. Note that, instead of being disposed in the first optical waveguide 10 at the emitting side, the optical phase π shifter 5 may be disposed in the second optical waveguide 20 at the emitting side.

At a signal input part 8 side, high frequency signals are input into the first and second signal electrodes 30 and 40. The first signal electrode 30 inputs a first high frequency signal into the first optical waveguide 10. Further, the second signal electrode 40 inputs a second high frequency signal having a reverse phase with respect to that of the first high frequency signal into the second optical waveguide 20. Ground electrodes 31 and 41 are respectively disposed along the first and second signal electrodes 30 and 40.

As illustrated in FIG. 8, the optical modulator 1 according to the first underlying technique includes bias tees 180 and 190 at a terminating part 9 side. The bias tee 180 is connected to the terminating part 9 of the first signal electrode 30. Further, the bias tee 190 is connected to the terminating part 9 of the second signal electrode 40.

The bias tee 180 includes an inductor 181 and a capacitor 182. Similarly, the bias tee 190 includes an inductor 191 and a capacitor 192.

Terminals of the bias tees 180 and 190 on a high frequency side are respectively connected to the terminating parts 9 of the first and second signal electrodes 30 and 40. Terminals of the bias tees 180 and 190 on a bias side are connected to a connection point 6. The direct current voltage supply 7 is connected to the connection point 6.

Impedances of the bias tees 180 and 190 are open to high frequency signals owing to the inductors 181 and 191, respectively. Therefore, without letting the high frequency signals subject to the influence of the impedances on the direct current voltage supply 7 side, direct current voltages can be applied to the first and second signal electrodes 30 and 40.

However, in the first underlying technique, the size of the inductors 181 and 191 respectively included in the bias tees 180 and 190 are large, making it difficult to downsize the optical modulator 1. Hence, there was a problem in being unable to satisfy the demand of the market.

Figure 9:
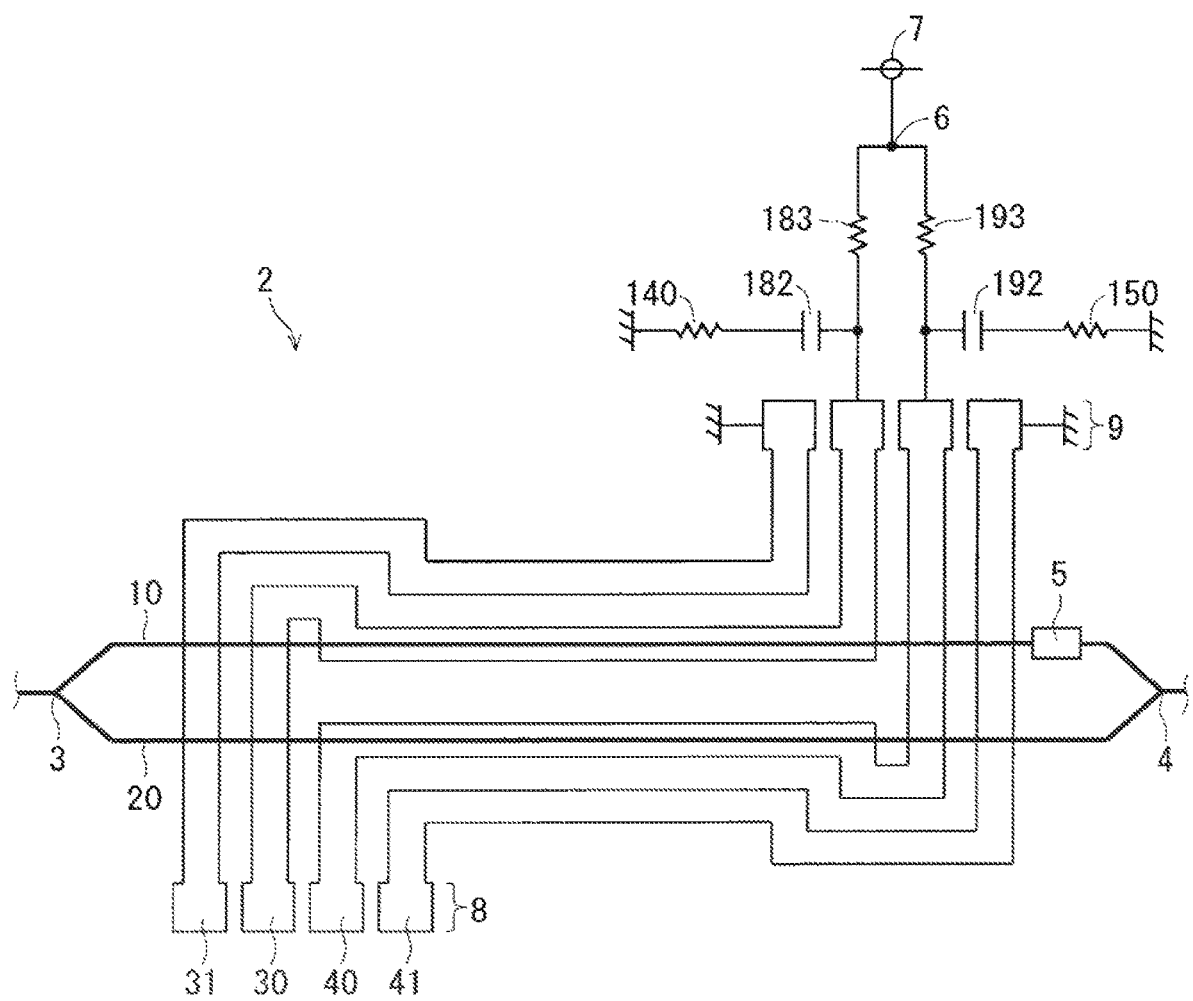
FIG. 9 is a diagram illustrating a configuration of an optical modulator according to a second underlying technique of the present invention.

FIG. 9 is a diagram illustrating a configuration of an optical modulator 2 according to a second underlying technique of the present invention. In the optical modulator 2, bias resistors 183 and 193 having high resistance are disposed, in place of the inductors 181 and 191 of the optical modulator 1. Here, the high resistance refers to from hundreds of ohms to several kiloohms. The bias resistors 183 and 193 are set to have values as high as from hundreds of ohms to several kiloohms, and therefore impedances of the bias resistors 183 and 193 can be regarded to be open to high frequency signals.

Therefore, without letting the high frequency signals subject to the influence of the impedances on the direct current voltage supply 7 side, direct current voltages can be applied to the first and second signal electrodes 30 and 40.

In the optical modulator 2, a direct current of a maximum of 1 mA is generated in consequence of a change in a refractive index of the semiconductor MQW structure forming the first and second optical waveguides 10 and 20. The direct current flows through the bias resistors 183 and 193, and therefore a large direct current voltage drop occurs in the bias resistors 183 and 193.

With the purpose that the high frequency signals are not subject to the influence of the direct current voltage supply 7 side, the resistance values of the bias resistors 183 and 193 are set to from hundreds of ohms to several kiloohms. Therefore, it is required that the set value of the direct current voltage supply 7 be larger than direct current voltage values applied to the first and second signal electrodes 30 and 40 by an amount corresponding to the voltage drop. As a result, there was a problem in increasing power consumption. The embodiments of the present invention to be described below solve the above-mentioned problems.

<First Embodiment>

Figure 1:
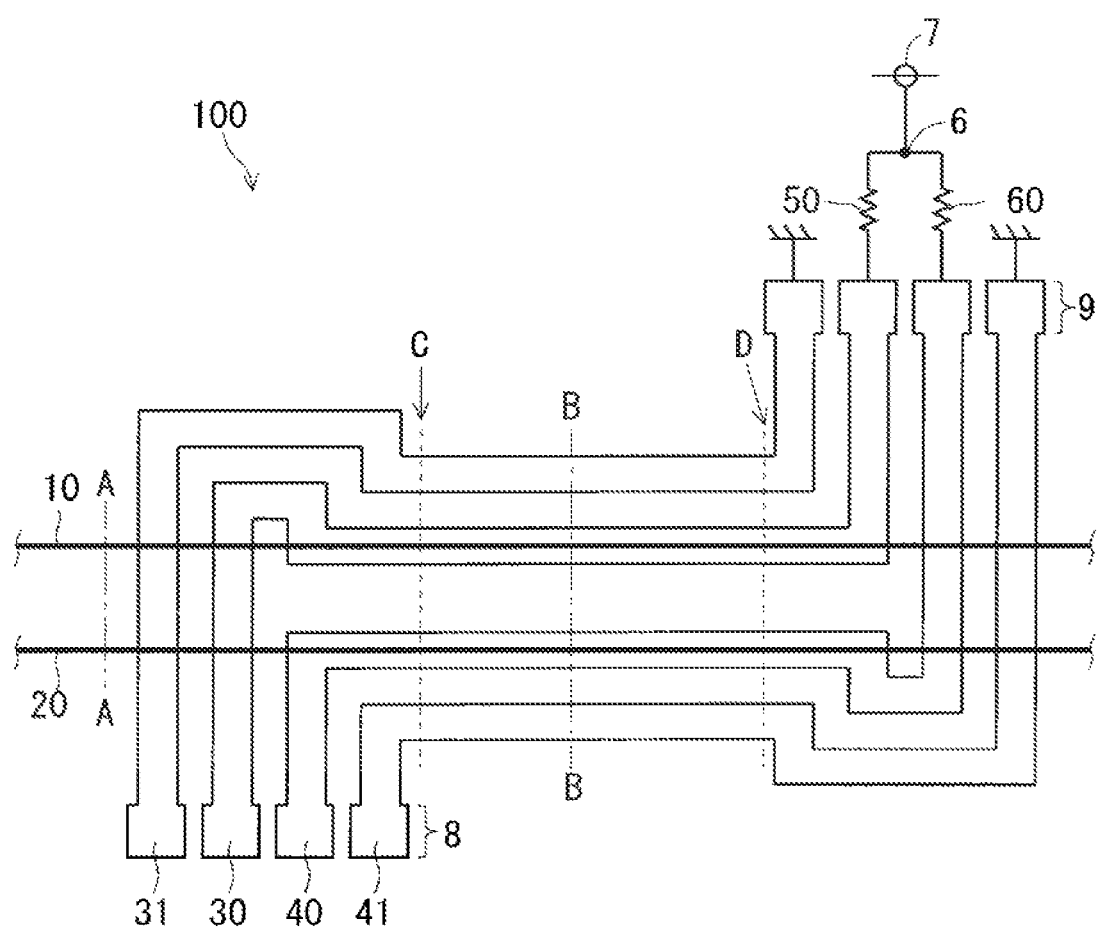
FIG. 1 is a diagram illustrating a configuration of an optical modulator according to a first embodiment.

FIG. 1 is a diagram illustrating a configuration of an optical modulator 100 according to a first embodiment of the present invention. Further, FIG. 2 is a cross-sectional view taken along the line segment A-A in FIG. 1. FIG. 3 is a cross-sectional view taken along the line segment B-B in FIG. 1.

As illustrated in FIG. 1, the optical modulator 100 is a semiconductor Mach-Zehnder optical modulator (MZM). The optical modulator 100 includes first and second optical waveguides 10 and 20 that propagate divided beams of light, first and second signal electrodes 30 and 40, first and second terminating resistors 50 and 60, a connection point 6, and a direct current voltage supply 7.

The first signal electrode 30 inputs a first high frequency signal into the first optical waveguide 10. The second signal electrode 40 inputs a second high frequency signal having a reverse phase with respect to that of the first high frequency signal into the second optical waveguide 20. Ground electrodes 31 and 41 are respectively disposed along the first and second signal electrodes 30 and 40.

The first terminating resistor 50 is connected to the first signal electrode 30 at a terminating part 9 side. The second terminating resistor 60 is connected to the second signal electrode 40 at the terminating part 9 side. The connection point 6 connects the first and second signal electrodes 30 and 40 via the first and second terminating resistors 50 and 60. The direct current voltage supply 7 is connected to the connection point 6.

Continuous light from a semiconductor laser not shown is subjected to demultiplexing to be divided into two beams of light at an optical demultiplexer not shown, and the beams of light are then propagated in respective first and second optical waveguides 10 and 20. An optical phase $\pi$ shifter not shown is connected to the first optical waveguide 10 at an emitting side. The optical phase $\pi$ shifter inverts a phase of the light by $\pi$. The beams of light emitted from the first and second optical waveguides 10 and 20 are subjected to multiplexing at an optical multiplexer not shown. The continuous light that has been subjected to phase modulation is emitted from the optical multiplexer. Note that, instead of being disposed in the first optical waveguide 10 at the emitting side, the optical phase $\pi$ shifter may be disposed in the second optical waveguide 20 at the emitting side.

The first terminating resistor 50 terminates the first signal electrode 30 at the terminating part 9 side. Further, the second terminating resistor 60 terminates the second signal electrode 40. End portions of the first and second terminating resistors 50 and 60 on the opposite side to the first and second signal electrodes 30 and 40 are connected to the connection point 6. The direct current voltage supply 7 is connected to the connection point 6.

Next, operation of the optical modulator 100 will be described. The optical modulator 100 subjects incoming continuous light from a semiconductor laser to phase modulation by changing a refractive index of the semiconductor MQW structure forming the first and second optical waveguides 10 and 20, with the use of an electric signal.

The incoming continuous light from the semiconductor laser is subjected to demultiplexing at the optical demultiplexer to be divided into two beams of light having the identical phases, and the beams of light are propagated in respective first and second optical waveguides 10 and 20. As illustrated in FIG. 2, an n-type semiconductor layer 13, active layers 12 and 22, and p-type semiconductor layers 11 and 21 are stacked in order on a semi-insulating substrate 15, and an insulating film 14 is formed so as to cover these layers. The first optical waveguide 10 has a three-layer structure made up of the p-type semiconductor layer 11, the active layer 12, and the n-type semiconductor layer 13. Similarly, the second optical waveguide 20 has a three-layer structure made up of the p-type semiconductor layer 21, the active layer 22, and the n-type semiconductor layer 13. Beams of light propagated in the first and second optical waveguides 10 and 20 are propagated through respective active layers 12 and 22.

High frequency signals having reverse phases, i.e., differential high frequency signals, are input into the first and second signal electrodes 30 and 40 at an input part 8 side. In order to reduce reflection, the resistance values of the first and second terminating resistors 50 and 60 are set to be equal to characteristic impedances of the first and second signal electrodes 30 and 40, respectively. The resistance values of the first and second terminating resistors 50 and 60 are 50Ω, for example. Further, the characteristic impedances of the first and second signal electrodes 30 and 40 are set to be equal to internal resistance of a signal source of the high frequency signals.

Between the position C and the position D in FIG. 1, the beams of light propagated in the first and second optical waveguides 10 and 20 are modulated based on the high frequency signals input into the first and second signal electrodes 30 and 40. Then, as illustrated in FIG. 3, based on the input high frequency signals (i.e., high frequency voltages) and a direct current voltage value applied from the direct current voltage supply 7, phases of the beams of light propagated in the first and second optical waveguides 10 and 20 are changed by changing a refractive index of the MQW structure formed in the active layers 12 and 22, respectively. Note that, the cross-sectional structure from the position C to the position D is the same as the cross-sectional structure illustrated in FIG. 3.

The optical modulator 100 is controlled such that the beams of light propagated in the first and second optical waveguides 10 and 20 have the identical phases at the position C in FIG. 1, and that the beams of light have reverse phases at the position D. At the position D, the phase of the light propagated in the first optical waveguide 10 is $(0, \pi)$, and the phase of the light propagated in the second optical waveguide 20 is $(\pi, 0)$.

Further, the optical phase $\pi$ shifter (not shown) provided in the first optical waveguide 10 at the emitting side inverts the phase of the light propagated in the first optical waveguide 10 by $\pi$. After that, at the optical multiplexer (not shown), the beams of light propagated in the first and second optical waveguides 10 and 20 are subjected to multiplexing in the identical phases, thereby emitting continuous light whose phase is modulated to be $(0, \pi)$. In this manner, light is modulated with the use of an electric signal.

In order to obtain satisfactory optical characteristics in the optical modulator 100, an optimal drive voltage needs to be input into the first and second optical waveguides 10 and 20. The drive voltage consists of a high frequency signal and a direct current voltage that determines an operating point of the drive voltage. Therefore, a direct current voltage that determines the operating point needs to be applied to the first and second signal electrodes 30 and 40 from the direct current voltage supply 7, independently of the high frequency signals.

In the configuration in which a direct current voltage is applied to the first and second signal electrodes 30 and 40 from the direct current voltage supply 7, it is necessary that the high frequency signals be not subject to the influence of impedance on the direct current voltage supply 7 side. That is, internal impedance of the signal source of the high frequency signals, characteristic impedances of the first and second signal electrodes 30 and 40, and impedance on the terminating part side need to be matched. For example, if the impedance on the terminating part side is smaller, reflection of the high frequency signals on the terminating part side is increased due to unmatched impedances.

In view of this, in the optical modulator 100 according to the first embodiment, as illustrated in FIG. 1, the first and second signal electrodes 30 and 40 are connected to the connection point 6 via the first and second terminating resistors 50 and 60. Then, the direct current voltage supply 7 is connected to the connection point 6.

When differential high frequency signals are input into the first and second signal electrodes 30 and 40, the high frequencies propagated in the first and second signal electrodes 30 and 40 have identical amplitudes and reverse phases. The first and second signal electrodes 30 and 40 are designed such that electrical lengths of the propagated high frequencies become equal to each other.

Therefore, at the connection point 6, the high frequencies propagated in the first and second signal electrodes 30 and 40 are subjected to multiplexing in reverse phases. As a result, at the connection point 6, an electric potential becomes zero with respect to the high frequency signals input into the first and second signal electrodes 30 and 40. That is, the connection point 6 serves as a short point with respect to the high frequency signals input into the first and second signal electrodes 30 and 40.

Based on the above, without letting the high frequency signals subject to the influence of the impedances on the direct current voltage supply 7 side, direct current voltages can be applied to the first and second signal electrodes 30 and 40.

In the optical modulator 100 according to the first embodiment, there is an advantage in being capable of downsizing the optical modulator 100 because of the configuration in which direct current voltages are applied to the first and second signal electrodes 30 and 40, with no bias tees provided on the terminating part 9 side.

In the optical modulator 100 according to the first embodiment, the resistance values of the first and second terminating resistors 50 and 60 are values equal to characteristic impedances of the first and second signal electrodes 30 and 40, respectively, in order to reduce reflection. The characteristic impedances of the first and second signal electrodes 30 and 40 are values equal to internal impedance of a signal source of the high frequency signals.

In the optical modulator 100, a direct current of a maximum of 1 mA is generated in consequence of a change in a refractive index of the semiconductor MQW structure forming the first and second optical waveguides 10 and 20. The direct current flows through the first and second terminating resistors 50 and 60.

In the first embodiment, the first and second terminating resistors 50 and 60 are set to have values as low as 50Ω, for example, and therefore a voltage drop amount generated at the first and second terminating resistors 50 and 60 is sufficiently small as compared to that in the underlying technique (FIG. 9). For example, when a direct optical modulation current of 1 mA flows through a terminating resistor of 50Ω, the voltage drop amount is as sufficiently small as 0.05 V. Therefore, there is an advantage in being capable of suppressing increase in power consumption.

Further, even when the optical modulation current is changed in consequence of a change in intensity and wavelength of the light of a semiconductor laser as a light source, the voltage drop amount in the first and second terminating resistors 50 and 60 is sufficiently small. Therefore, there is an advantage in being capable of easily controlling direct current voltages to be applied to the first and second signal electrodes 30 and 40.

<Effects>

The optical modulator 100 according to the first embodiment includes the first and second optical waveguides 10 and 20 that propagate divided beams of light, the first signal electrode 30 that inputs a first high frequency signal into the first optical waveguide 10, the second signal electrode 40 that inputs a second high frequency signal having a reverse phase with respect to a phase of the first high frequency signal into the second optical waveguide 20, the first terminating resistor 50 connected to the first signal electrode 30 at the terminating part 9 side, the second terminating resistor 60 connected to the second signal electrode 40 at the terminating part 9 side, the connection point 6 that connects the first and second signal electrodes 30 and 40 via the first and second terminating resistors 50 and 60, and the direct current voltage supply 7 connected to the connection point 6. A resistance value of the first terminating resistor 50 is equal to characteristic impedance of the first signal electrode 30. A resistance value of the second terminating resistor 60 is equal to characteristic impedance of the second signal electrode 40.

Therefore, in the optical modulator 100 according to the first embodiment, there is an advantage in being capable of downsizing the optical modulator 100 because of the configuration in which direct current voltages are applied to the first and second signal electrodes 30 and 40, with no bias tees provided on the terminating part 9 side. Further, in the first embodiment, the values of the first and second terminating resistors 50 and 60 are set to be equal to characteristic impedances of the first and second signal electrodes 30 and 40, respectively, and therefore the voltage drop amount in the first and second terminating resistors 50 and 60 can be reduced. Therefore, there is an advantage in being capable of easily controlling direct current voltages to be applied to the first and second signal electrodes 30 and 40, as well as being capable of suppressing increase in power consumption.

<Second Embodiment>

FIG. 4 is a diagram illustrating a configuration of an optical modulator 200 according to a second embodiment of the present invention. In FIG. 4, the same components as those of the optical modulator 100 according to the first embodiment illustrated in FIG. 1 are denoted by the same reference symbols, and the description thereof is omitted.

As illustrated in FIG. 4, the optical modulator 200 according to the second embodiment further includes a first branch path 70 and a second branch path 80, as compared to the optical modulator 100 (FIG. 1) according to the first embodiment. The first branch path 70 branches from a main path connecting the first terminating resistor 50 and the connection point 6. The second branch path 80 branches from a main path connecting the second terminating resistor 60 and the connection point 6.

A capacitor 220 is connected to the first branch path 70. Further, a capacitor 230 is connected to the second branch path 80. The capacitors 220 and 230 are connected to ground. Impedances of the capacitors 220 and 230 with respect to the high frequency signals are herein sufficiently low.

In the optical modulator 100 according to the first embodiment, as illustrated in FIG. 1, the first and second signal electrodes 30 and 40 are connected at the connection point 6 via the first and second terminating resistors 50 and 60.

In the optical modulator, imbalance may be caused in difference between the high frequency signals input into the first and second signal electrodes 30 and 40. Further, imbalance may be caused in electrical lengths of the electric signals propagated in the first and second signal electrodes 30 and 40 due to the influence of manufacturing unevenness. In such cases as in the above, an electric potential at the connection point 6 may shift from zero with respect to the high frequency signals input into the first and second signal electrodes 30 and 40. When an electric potential at the connection point 6 shifts from zero, the high frequency signals are subject to the influence of impedance on the direct current voltage supply 7 side to increase reflection.

In view of this, in the optical modulator 200 according to the second embodiment, as illustrated in FIG. 4, the capacitor 220 is provided in the first branch path 70 that branches from a main path connecting the first terminating resistor 50 and the connection point 6. Further, the capacitor 230 is provided in the second branch path 80 that branches from a main path connecting the second terminating resistor 60 and the connection point 6.

With this, even when imbalance is caused in difference between the high frequency signals and in electrical lengths of the first and second signal electrodes 30 and 40, the capacitors 220 and 230 compensate the electric potential such that the electric potential at the connection point 6 becomes zero with respect to the imbalanced high frequency signals. Thus, the high frequency signals can be less influenced by the impedance on the direct current voltage supply 7 side. That is, without letting the high frequency signals subject to the influence of the impedances on the direct current voltage supply 7 side, direct current voltages can be applied to the first and second signal electrodes 30 and 40.

<Modification>

Figure 5:
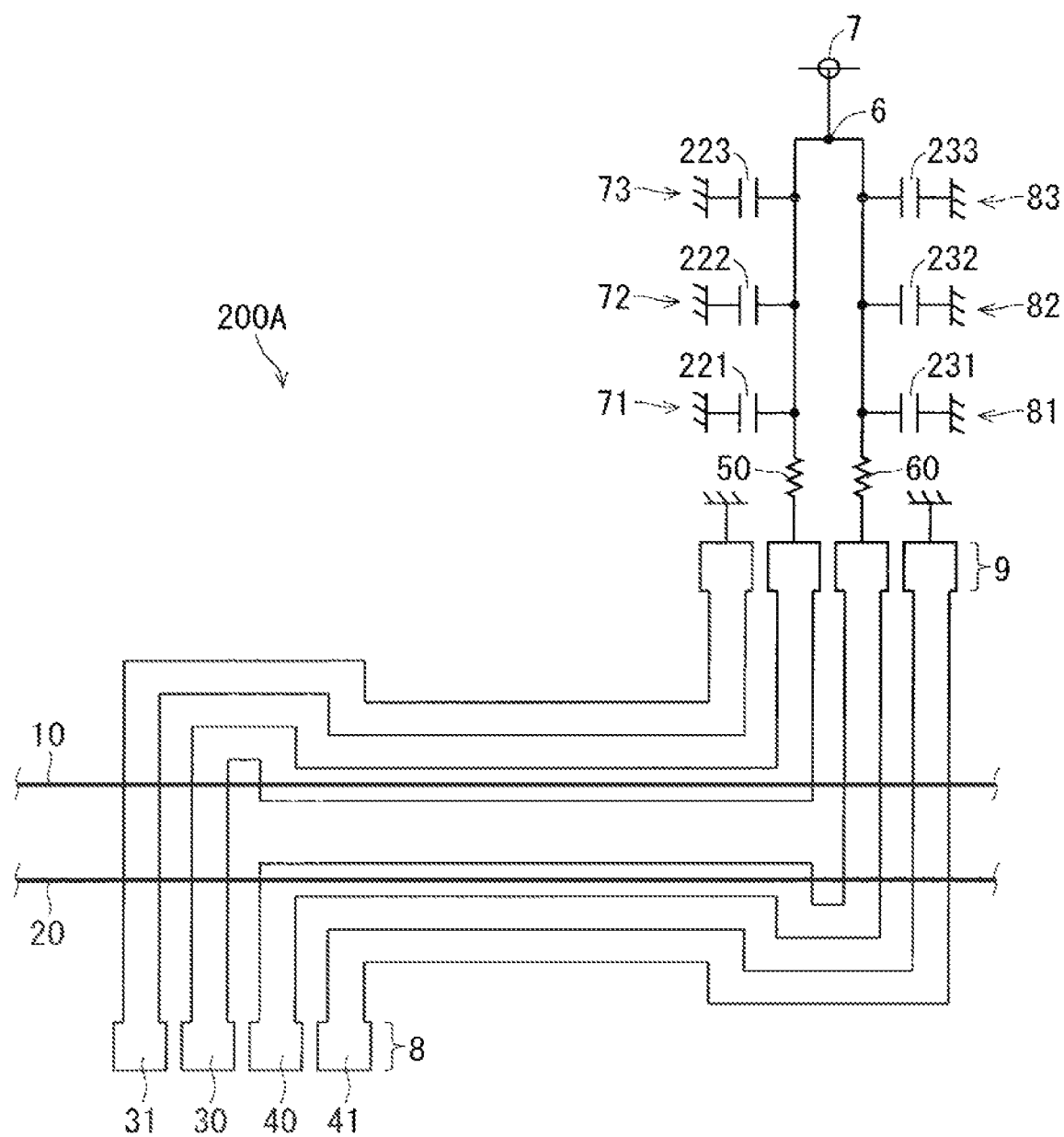
FIG. 5 is a diagram illustrating a configuration of the optical modulator according to the second embodiment.

FIG. 5 is a diagram illustrating an optical modulator 200A as a modification of the optical modulator 200 according to the second embodiment. In the optical modulator 200 (FIG. 4), a single first branch path 70 and a single second branch path 80 are provided. On the other hand, in the optical modulator 200A, a plurality of first branch paths 71, 72, and 73 and a plurality of second branch paths 81, 82, and 83 are provided.

As illustrated in FIG. 5, the optical modulator 200A according to this modification includes three first branch paths 71, 72, and 73 that branch from the main path connecting the first terminating resistor 50 and the connection point 6. Further, the optical modulator 200A includes three second branch paths 81, 82, and 83 that branch from the main path connecting the second terminating resistor 60 and the connection point 6.

Capacitors 221, 222, and 223 are connected to the first branch paths 71, 72, and 73, respectively. The capacitors 221, 222, and 223 are connected to ground. Capacitance values of the capacitors 221, 222, and 223 are different from one another. For example, a capacitance value of the capacitor 221 is such a value as to have impedance sufficiently low with respect to a high frequency, a capacitance value of the capacitor 222 is such a value as to have impedance sufficiently low with respect to a frequency lower than that for the capacitor 221, and a capacitance value of the capacitor 223 is such a value as to have impedance sufficiently low with respect to a frequency lower than that for the capacitor 222.

Capacitors 231, 232, and 233 are connected to the second branch paths 81, 82, and 83, respectively. The capacitors 231, 232, and 233 are connected to ground. Capacitance values of the capacitors 231, 232, and 233 are different from one another. For example, a capacitance value of the capacitor 231 is such a value as to have impedance sufficiently low with respect to a high frequency, a capacitance value of the capacitor 232 is such a value as to have impedance sufficiently low with respect to a frequency lower than that for the capacitor 231, and a capacitance value of the capacitor 233 is such a value as to have impedance sufficiently low with respect to a frequency lower than that for the capacitor 232.

Commercially available capacitors and capacitors produced through a semiconductor process intrinsically have a parasitic inductance component as well as a capacitance component, and the inductance component is larger as a frequency is higher. Imbalance in difference between the high frequency signals input into the first and second signal electrodes 30 and 40 and imbalance in electrical lengths the electric signals propagated in the first and second signal electrodes 30 and 40 due to manufacturing unevenness may be caused in a wide range of frequencies.

In view of this, in the optical modulator 200A illustrated in FIG. 5, in order to compensate the electric potential at the connection point 6 to become zero when imbalance is caused in difference between the high frequency signals in a wide range of frequencies, the plurality of capacitors 221, 222, and 223 having different capacities are respectively provided in the plurality of first branch paths 71, 72, and 73 that branch from the main path connecting the first terminating resistor 50 and the connection point 6. Further, the plurality of capacitors 231, 232, and 233 having different capacitance values are respectively provided in the plurality of second branch paths 81, 82, and 83 that branch from the main path connecting the second terminating resistor 60 and the connection point 6.

Note that, the electrical length is larger as the frequency is higher. Therefore, as illustrated in FIG. 5, the configuration in which the capacitors 221 and 231 for higher frequencies are disposed closer to the first and second terminating resistors 50 and 60 can more effectively compensate the electric potential at the connection point 6 to become zero with respect to the high frequency signals.

Further, in this modification, the number of the first branch paths 71, 72, and 73 is three. However, the number is not limited thereto on the condition that a plurality of first branch paths are provided. Similarly, in this modification, the number of the second branch paths 81, 82, and 83 is three. However, the number is not limited thereto on the condition that a plurality of second branch paths are provided.

<Effects>

The optical modulator 200 according to the second embodiment further includes at least one first branch path 70 that branches from the main path connecting the first terminating resistor 50 and the connection point 6, and at least one second branch path 80 that branches from the main path connecting the second terminating resistor 60 and the connection point 6. The capacitor 220 is connected to the first branch path 70. The capacitor 230 is connected to the second branch path 80.

In the optical modulator 200 according to the second embodiment, even when imbalance is caused in difference between the high frequency signals, the capacitor 220 provided in the first branch path 70 and the capacitor 230 provided in the second branch path 80 compensate the electric potential at the connection point 6 to become zero with respect to the high frequency signals. Therefore, without letting the high frequency signals subject to the influence of the impedances on the direct current voltage supply 7 side, direct current voltages can be applied to the first and second signal electrodes 30 and 40.

Further, in the optical modulator 200A according to the modification of the second embodiment, the at least one first branch path 70 includes a plurality of first branch paths. Capacitance values of the capacitors 221, 222, and 223 respectively connected to the plurality of the first branch paths 71, 72, and 73 are different from one another. The at least one second branch path 80 includes a plurality of second branch paths. Capacitance values of the capacitors 231, 232, and 233 respectively connected to the plurality of the second branch paths 81, 82, and 83 are different from one another.

In the optical modulator 200A according to the modification of the second embodiment, even when imbalance is caused in difference between the high frequency signals in a wide range of frequencies, the capacitors 221, 222, and 223 having different capacitance values that are respectively provided in the plurality of first branch paths 71, 72, and 73 and the capacitors 231, 232, and 233 having different capacitance values that are respectively provided in the plurality of second branch paths 81, 82, and 83 compensate the electric potential at the connection point 6 to become zero with respect to the high frequency signals. Therefore, without letting the high frequency signals subject to the influence of the impedances on the direct current voltage supply 7 side, direct current voltages can be applied to the first and second signal electrodes 30 and 40.

<Third Embodiment>

FIG. 6 is a diagram illustrating a configuration of an optical modulator 300 according to a third embodiment of the present invention. In FIG. 6, the same components as those of the optical modulator 100 (FIG. 1) according to the first embodiment or the optical modulator 200 (FIG. 4) according to the second embodiment are denoted by the same reference symbols, and the description thereof is omitted.

As illustrated in FIG. 6, the optical modulator 300 according to the third embodiment further includes a branch path 90, as compared to the optical modulator 100 (FIG. 1) according to the first embodiment. The branch path 90 branches from a main path connecting the connection point 6 and the direct current voltage supply 7. A capacitor 240 is connected to the branch path 90. The capacitor 240 is connected to ground. Impedance of the capacitor 240 with respect to the high frequency signals is herein sufficiently low.

<Modification>

Figure 7:
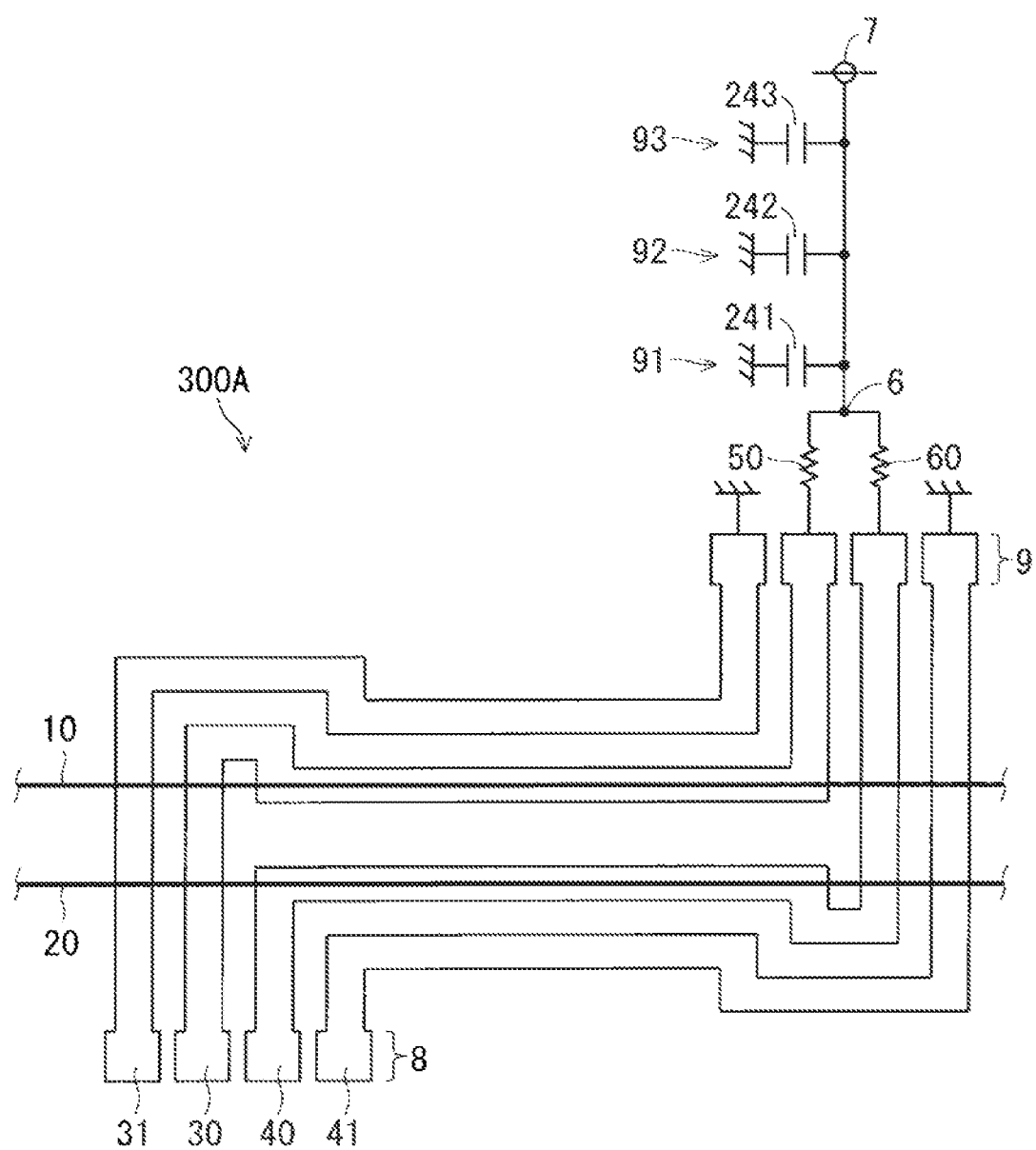
FIG. 7 is a diagram illustrating a modification of the optical modulator according to the third embodiment.

FIG. 7 is a diagram illustrating an optical modulator 300A as a modification of the optical modulator 300 according to the third embodiment. In the optical modulator 300 (FIG. 6), a single branch path 90 is provided. On the other hand, in the optical modulator 300A, a plurality of branch paths 91, 92, and 93 are provided.

As illustrated in FIG. 7, the optical modulator 300A according to this modification includes three branch paths 91, 92, and 93 that branch from the main path connecting the connection point 6 and the direct current voltage supply 7. Capacitors 241, 242, and 243 are connected to the branch paths 91, 92, and 93, respectively. The capacitors 241, 242, and 243 are connected to ground. Capacitance values of the capacitors 241, 242, and 243 are different from one another. For example, a capacitance value of the capacitor 241 is such a value as to have impedance sufficiently low with respect to a high frequency, a capacitance value of the capacitor 242 is such a value as to have impedance sufficiently low with respect to a frequency lower than that for the capacitor 241, and a capacitance value of the capacitor 243 is such a value as to have impedance sufficiently low with respect to a frequency lower than that fir the capacitor 242.

Note that, in this modification, the number of the branch paths 91, 92, and 93 is three. However, the number is not limited thereto on the condition that a plurality of branch paths are provided.

<Effects>

The optical modulator 300 according to the third embodiment further includes at least one branch path 90 that branches from the main path connecting the connection point 6 and the direct current voltage supply 7. The capacitor 240 is connected to the branch path 90.

Therefore, in the optical modulator 300 according to the third embodiment, the effects similar to those of the optical modulator 200 according to the second embodiment can be obtained, and also the number of capacitors can be reduced as compared to that in the optical modulator 200. Thus, there is an advantage in being capable of suppressing increase in the size of the optical modulator 300.

Further, in the optical modulator 300A according to the modification of the third embodiment, the at least one branch path 90 includes a plurality of branch paths. Capacitance values of the capacitors 241, 242, and 243 respectively connected to the plurality of the branch paths 91, 92, and 93 are different from one another.

In the optical modulator 300A according to the modification of the third embodiment, even when imbalance is caused in difference between the high frequency signals in a wide range of frequencies, the capacitors 241, 242, and 243 having different capacitance values that are respectively provided in the plurality of branch paths 91, 92, and 93 compensate the electric potential at the connection point 6 to become zero with respect to the high frequency signals. Therefore, without letting the high frequency signals subject to the influence of the impedances on the direct current voltage supply 7 side, direct current voltages can be applied to the first and second signal electrodes 30 and 40. Further, as compared to the optical modulator 200A according to the modification of the second embodiment, the number of capacitors can be reduced. Thus, there is an advantage in being capable of suppressing increase in the size of the optical modulator 300A.

Note that, in the present invention, each of the embodiments may be freely combined, and each of the embodiments may be appropriately modified or omitted within the scope of the invention. While the invention has been shown and described in detail, the foregoing description is in all aspects illustrative and not restrictive. It is therefore understood that unillustrated numerous modifications can be devised without departing from the scope of the invention.

EXPLANATION OF REFERENCE SIGNS

1, 2, 100, 200, 200A, 300, 300A optical modulator, 3 optical demultiplexer, 4 optical multiplexer, 5 optical phase π shifter, 6 connection point, 7 direct current voltage supply, 8 signal input part, 9 terminating part, 10 first optical waveguide, 20 second optical waveguide, 30 first signal electrode, 31, 41 ground electrode, 40 second signal electrode, 50 first terminating resistor, 60 second terminating resistor, 70, 71, 72, 73 first branch path, 80, 81, 82, 83 second branch path, 90, 91, 92, 93 branch path, 140, 150, 183, 193 terminating resistor, 180, 190 bias tee, 181, 191 inductor, 182, 192 capacitor, 220, 221, 222, 223, 230, 231, 232, 233, 240, 241, 242, 243 capacitor

The invention claimed is:

1. An optical modulator comprising:
    first and second optical waveguides that propagate divided beams of light;
    a first signal electrode that inputs a first high frequency signal into the first optical waveguide;
    a second signal electrode that is adjacent to the first signal electrode and that inputs a second high frequency signal having a reverse phase with respect to a phase of the first high frequency signal into the second optical waveguide;

a first ground electrode that is adjacent to the first signal electrode on a side opposite the second signal electrode;

a second ground electrode that is adjacent to the second signal electrode on a side of the second signal electrode opposite the first signal electrode;

a first terminating resistor connected to the first signal electrode at a terminating part side;

a second terminating resistor connected to the second signal electrode at a terminating part side;

a connection point that connects the first and second signal electrodes via the first and second terminating resistors; and a direct current voltage supply connected to the connection point, wherein a resistance value of the first terminating resistor is equal to a characteristic impedance of the first signal electrode, and a resistance value of the second terminating resistor is equal to a characteristic impedance of the second signal electrode.

2. The optical modulator according to claim 1, further comprising:

at least one first branch path that branches from a main path connecting the first terminating resistor and the connection point; and at least one second branch path that branches from a main path connecting the second terminating resistor and the connection point, wherein a capacitor is connected to the first branch path, and a capacitor is connected to the second branch path.

3. The optical modulator according to claim 2, wherein the at least one first branch path comprises a plurality of first branch paths, capacitance values of capacitors connected to the plurality of the first branch paths are different from one another, the at least one second branch path comprises a plurality of second branch paths, and capacitance values of capacitors connected to the plurality of the second branch paths are different from one another.

4. The optical modulator according to claim 1, further comprising at least one branch path that branches from a main path connecting the connection point and the direct current voltage supply, wherein a capacitor is connected to the branch path.

5. The optical modulator according to claim 4, wherein the at least one branch path comprises a plurality of branch paths, and capacitance values of the capacitors connected to the plurality of the branch paths are different from one another.

6. The optical modulator according to claim 1, wherein the first and second signal electrodes and the first and second ground electrodes are coplanar.

7. The optical modulator according to claim 1, wherein the first and second signal electrodes include at least one right-angle bend.

* * * * *